US010123183B2

(12) United States Patent
Kim

(10) Patent No.: US 10,123,183 B2
(45) Date of Patent: Nov. 6, 2018

(54) VOICE MESSAGING METHOD AND MOBILE TERMINAL SUPPORTING VOICE MESSAGING IN MOBILE MESSENGER SERVICE

(71) Applicant: Samsung Electronics Co., Ltd., Gyeonggi-do (KR)

(72) Inventor: Eun Ju Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/855,647

(22) Filed: Dec. 27, 2017

(65) Prior Publication Data
US 2018/0124579 A1 May 3, 2018

Related U.S. Application Data

(63) Continuation of application No. 15/461,036, filed on Mar. 16, 2017, now Pat. No. 9,888,367, which is a continuation of application No. 15/092,085, filed on Apr. 6, 2016, now Pat. No. 9,635,525, which is a continuation of application No. 14/087,965, filed on Nov. 22, 2013, now Pat. No. 9,338,614, which is a
(Continued)

(30) Foreign Application Priority Data

Apr. 24, 2006 (KR) .......................... 10-2006-0036634

(51) Int. Cl.
H04W 4/12 (2009.01)
H04M 3/533 (2006.01)
H04M 7/00 (2006.01)
H04L 12/58 (2006.01)

(52) U.S. Cl.
CPC ............... H04W 4/12 (2013.01); H04L 51/04 (2013.01); H04M 3/533 (2013.01); H04M 7/0045 (2013.01); H04L 51/38 (2013.01)

(58) Field of Classification Search
CPC ........ H04L 51/04; H04M 7/0045; H04W 4/12
USPC ..... 455/410, 414.1, 445, 466; 370/230, 235, 370/312, 329, 401
See application file for complete search history.

(56) References Cited

U.S. PATENT DOCUMENTS 5,881,104 A    3/1999  Akahane
6,453,289 B1   9/2002  Ertem et al.
6,816,578 B1   11/2004 Kredo et al.
(Continued)

FOREIGN PATENT DOCUMENTS

CN    1691806      11/2005
EP    1 331 786    7/2003
(Continued)

Primary Examiner — Sam Bhattacharya
(74) Attorney, Agent, or Firm — The Farrell Law Firm, P.C.

(57) ABSTRACT

A mobile terminal supporting a voice messaging method includes a microphone for capturing sound waves and converting the sound waves into an audio signal, a storage unit for storing the audio signal, an audio data generation unit for generating audio data packets with the audio signal, a packet data communication network interface unit for providing a packet data communication network, and a control unit for controlling the microphone, audio storage unit, audio data generation unit, and packet data communication network interface unit to capture the audio signal and transmit the audio signal as audio data packets in response to audio message transmission request entered during a mobile messenger service session.

20 Claims, 4 Drawing Sheets

Related U.S. Application Data continuation of application No. 11/788,072, filed on Apr. 19, 2007, now Pat. No. 8,605,638.

(56) References Cited

U.S. PATENT DOCUMENTS

| | | |
|---|---|---|
| 6,983,145 B1 | 1/2006 | Uskela |
| 7,085,258 B2 | 8/2006 | Creamer et al. |
| 7,103,548 B2 | 9/2006 | Squibbs et al. |
| 7,184,786 B2 | 2/2007 | Mumick et al. |
| 7,366,658 B2 | 4/2008 | Moogi et al. |
| 7,548,754 B2 | 6/2009 | Shivaram et al. |
| 9,338,614 B2 | 5/2016 | Kim |
| 2003/0219104 A1 | 11/2003 | Malik |
| 2004/0001480 A1 | 1/2004 | Tanigawa et al. |
| 2004/0030583 A1 | 2/2004 | Fleming |
| 2004/0137945 A1 | 7/2004 | Takagi |
| 2005/0197143 A1 | 9/2005 | Lee et al. |
| 2006/0034340 A1 | 2/2006 | Rang et al. |
| 2006/0205362 A1 | 9/2006 | Chang et al. |
| 2008/0069315 A1 | 3/2008 | Tanigawa et al. |

FOREIGN PATENT DOCUMENTS

| | | |
|---|---|---|
| EP | 1 321 002 | 3/2009 |
| JP | 2003/515283 | 4/2003 |
| JP | 2004/013303 | 1/2004 |
| JP | 2004-507979 | 3/2004 |
| KR | 100487446 | 4/2005 |
| KR | 1020050089258 | 9/2005 |
| WO | WO 01/37527 | 5/2001 |
| WO | WO 02/19666 | 3/2002 |

VOICE MESSAGING METHOD AND MOBILE TERMINAL SUPPORTING VOICE MESSAGING IN MOBILE MESSENGER SERVICE

PRIORITY

This application is a Continuation Application of, and claims priority under 35 U.S.C. § 120 to, U.S. application Ser. No. 15/461,036, which was filed in the U.S. Patent and Trademark Office on Mar. 16, 2017 and was a Continuation Application of, and claimed priority under 35 U.S.C. § 120 to, U.S. application Ser. No. 15/092,085, which was filed in the U.S. Patent and Trademark Office on Apr. 6, 2016, issued on Apr. 25, 2017 as U.S. Pat. No. 9,635,525, and was a Continuation Application of, and claimed priority under 35 U.S.C. § 120 to, U.S. application Ser. No. 14/087,965, which was filed in the U.S. Patent and Trademark Office on Nov. 22, 2013, issued as U.S. Pat. No. 9,338,614 on May 10, 2016, and was a Continuation Application of, and claimed priority under 35 U.S.C. § 120 to, U.S. application Ser. No. 11/788,072, which was filed in the U.S. Patent and Trademark Office on Apr. 19, 2007, issued as U.S. Pat. No. 8,605,638 on Dec. 10, 2013, and claimed priority under 35 U.S.C. § 119 to Korean Patent Application No. 10-2006-0036634, which was filed in the Korean Intellectual Property Office on Apr. 24, 2006, and entitled "Voice Messaging Method and Mobile Terminal Supporting Voice Messaging In Mobile Messenger Service," the contents of all of which are incorporated herein by reference.

BACKGROUND OF THE INVENTION

1. Field of the Invention

The present invention relates to a mobile terminal and, in particular, to a voice messaging method and a mobile terminal supporting the voice messaging method in a mobile messenger service.

2. Description of the Related Art

With the advance of wireless technologies, mobile communication systems including Code Division Multiple Access (CDMA) system has been developed to provide multimedia communication services in addition to the basic service of voice communication service.

Keeping pace with popularity of the multimedia communications, mobile terminals become closer to personal computers (PC) in their capabilities. For example, recent mobile terminals incorporate various supplementary functions such as messaging service, image transmission, contact list management, and scheduler functions. Accordingly, the mobile terminal must store various kinds of data such as residential addresses, internet mail addresses, avatars, and the like, as well as call numbers.

Rapid growth of such multimedia services has led to the increase of utilization of mobile terminals and strong demands for various mobile services including messaging service.

As one of such mobile services, mobile messenger services allow subscribers to exchange data in real time. The mobile messenger service enables the subscribers to exchange memos, files, and other data and to participate in a real time chatting and group telephony.

Typically, the conventional mobile messenger services use text messages for communication between the subscribers and support a group chatting which allow several subscribers to take part in a chatting session.

However, the conventional mobile messenger services have some drawbacks in that voice communication is not supported during a mobile messenger service session and a person-to-person messaging is not allowed in a group chatting.

SUMMARY OF THE INVENTION

The present invention has been made in an effort to solve the above problems, and it is an object of the present invention to provide a voice messaging method allowing a mobile terminal operating with the voice messaging method to transmit a voice message using a mobile messenger service.

It is another object of the present invention to provide a voice messaging method allowing a mobile terminal operating with the voice messaging method to transmit a voice message to one of members participated in a chatting session of a mobile messenger service.

In accordance with an aspect of the present invention, the above and other objects are accomplished by a mobile terminal. The mobile terminal includes a microphone for capturing sound wave and converting the sound wave into an audio signal; an audio storage unit for storing the audio signal; an audio data generation unit for generating audio data packets with the audio signal; a packet data communication network interface unit for providing a packet data communication network; a control unit for controlling the microphone, audio storage unit, audio data generation unit, and packet data communication network interface unit to capture the audio signal and transmit the audio signal in the form of the audio data packets in response to audio message transmission request input in the middle of a mobile messenger service session.

Preferably, the microphone captures a user voice as the sound wave and stores user voice in the form of the audio signal in the storage unit.

Preferably, the audio data generation unit encodes the user voice into audio data, segments the audio data into transmission data units, and generates the audio data packets contained in the transmission data units together with source and destination Internet Protocol addresses.

Preferably, the audio data generation unit performs encoding the user voice and segmentation of the audio data using an enhanced variable rate codec.

Preferably, the packet data communication network interface unit transmits the audio data packets to a target terminal participating in a mobile messenger service session with the mobile terminal through the packet data communication network.

Preferably, the mobile terminal further includes an audio decoding unit for decoding the audio data packets; and a speaker to output the decoded audio data packets in the form of an audible sound wave, wherein the packet data communication network unit transfers the audio data packets received in the mobile messenger service session to an audio decoding unit.

In accordance with another aspect of the present invention, the above and other objects are accomplished by a voice messaging method for a mobile terminal in a mobile messenger service session. The voice messaging method includes recording a voice message in response to a voice message transmission request input in the middle of the mobile messenger service session; generating audio data packets containing the voice message; and transmitting the audio data packets through a packet data communication network in a predetermined period.

Preferably, generating the audio data packets includes encoding the voice message; segmenting the encoded voice message into transmission data units of a predetermined size; and packing the data units with the audio data packets together with source and destination Internet Protocol addresses.

Preferably, encoding the voice message includes compressing the voice message using an enhanced variable rate codec.

Preferably, the voice messaging method further includes receiving audio data packets through the packet data communication network in the middle of the mobile messenger service session; decoding the audio data packets; and outputting the audio data decoded from the audio data packet in the form of an audible sound wave.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Exemplary embodiments of the present invention are described with reference to the accompanying drawings. The same reference numbers are used throughout the drawings to refer to the same or like parts. Detailed descriptions of well-known functions and structures incorporated herein may be omitted to avoid obscuring the subject matter of the present invention.

Figure 1:
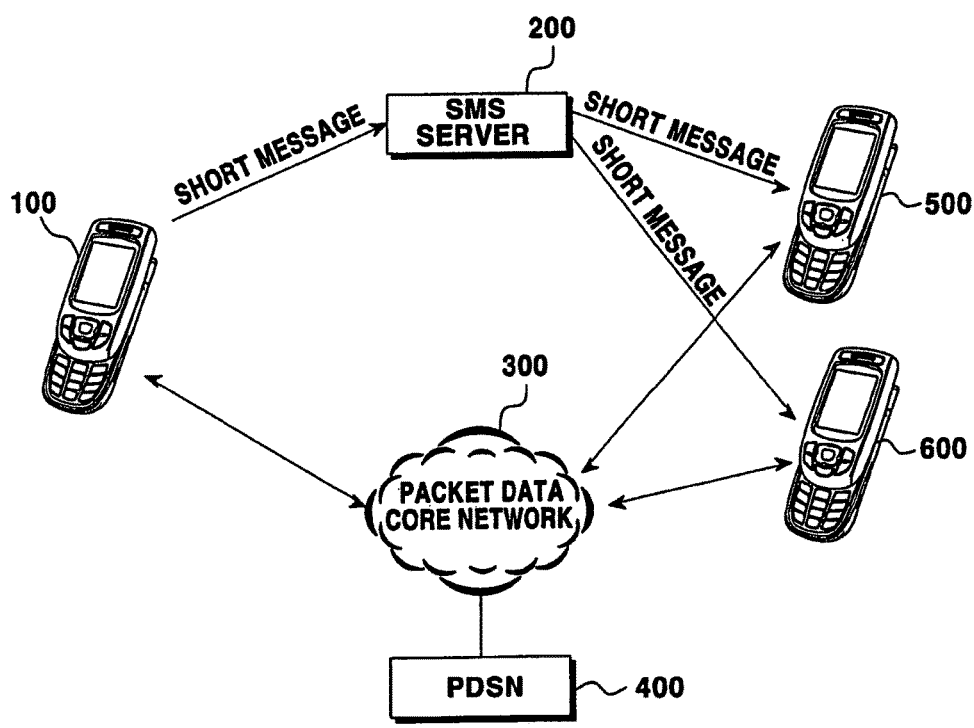
FIG. 1 is an overview of a mobile messenger service system according to the present invention.

Referring to FIG. 1, the mobile messenger service system includes a plurality of mobile terminals 100, 500, and 600, a short message service (SMS) server 200, a packet data core network 300, and a packet data serving node (PDSN) 400.

The mobile terminals 100, 500, and 600 are provided with a mobile messenger application. In this embodiment, a host mobile terminal 100 transmits an invitation message and client mobile terminals 500 and 600 transmit acceptance message to host mobile terminal 100 in response to the invitation message.

SMS server 200 provides short messaging service to a mobile communication network (for example, CDMA network). In this embodiment, SMS server 200 relays the invitation message transmitted by host mobile terminal 100 to client mobile terminals 500 and 600.

Packet data core network 300 establishes communication channels between the mobile terminals using a point-to-point protocol (PPP) and supporting packet data communication. Packet data core network 300 also supports a mobile messenger service after a mobile messenger service session is initialized. That is, packet data core network 300 is configured to support the real time data exchanges between the host and client mobile terminals 100, 500, and 600. For example, the packet data core network bridges the information message transmitted by host mobile terminal 100 to client mobile terminal 500 and 600, bridges the information message transmitted by client mobile terminal 500 to host mobile terminal 100 and client mobile terminal 600, and bridges the information message transmitted by client mobile terminal 600 to host mobile terminal 100 and client mobile terminal 500.

An operation of the above-structured messenger service system is described with reference to FIG. 2.

Figure 2:
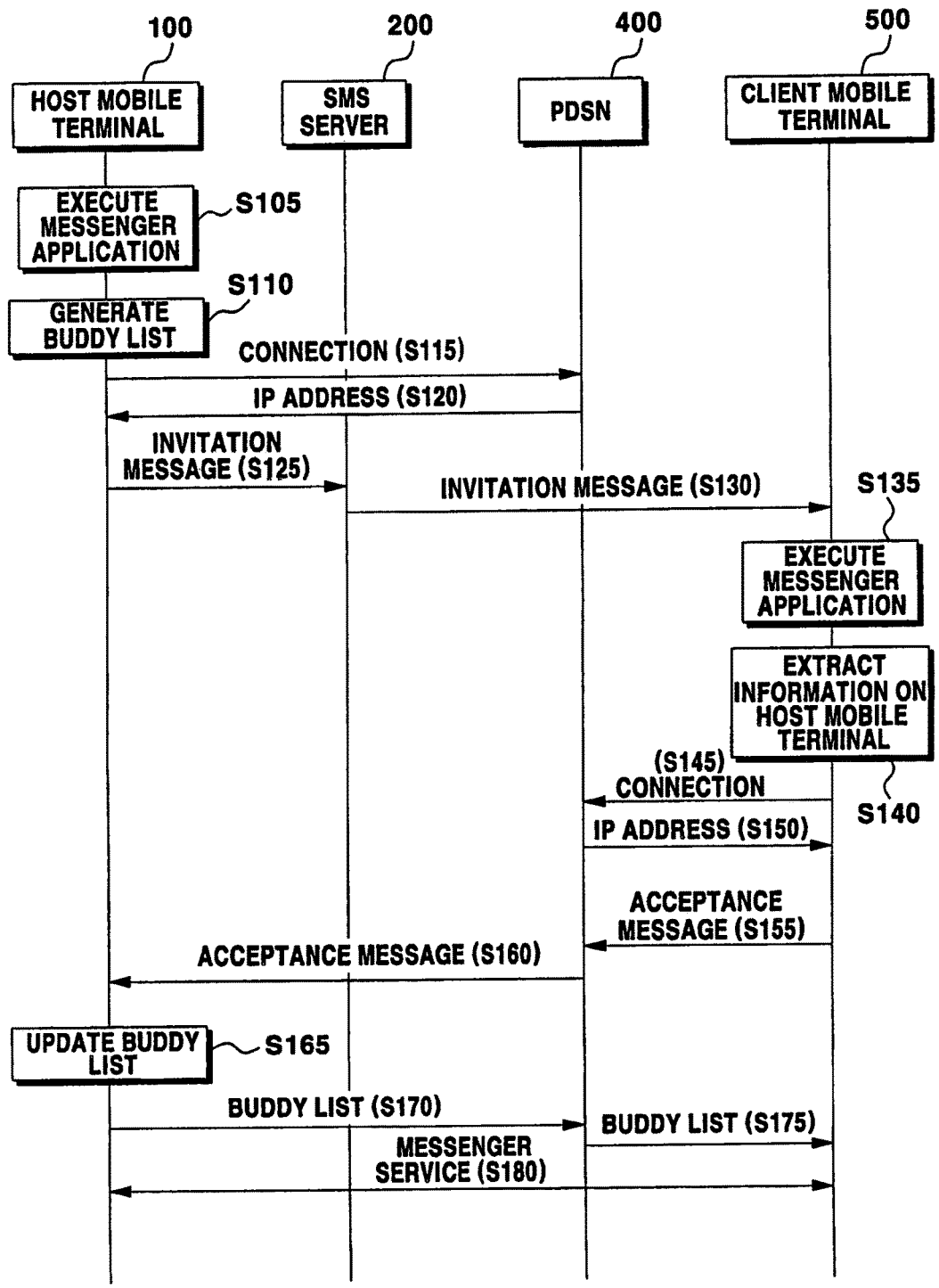
FIG. 2 is a message flow diagram illustrating message flows in the messenger service system of FIG. 1.

Referring to FIG. 2, if a command input for the mobile messenger service is detected while operating in a normal mode, host mobile terminal 100 activates the messenger application in step S105. Next, host mobile terminal 100 generates a buddy list on the basis of a user command in step S110. After the buddy list is generated, host mobile terminal 100 transmits a connection request message to PDSN 400 in step S115 and assigned an Internet Protocol (IP) address at step S120 so as to establish a point-to-point channel.

The buddy list provides a group of members registered for the mobile messenger service (so called, counterparty user lists). Preferably, the buddy list is created with the candidate participants selected from the subscribers stored in the mobile terminal. However, the participants can be selected in such a manner that the service subscribers are listed in a normal phonebook with a specific indicator and choosing the participants among the subscribers listed in a normal phonebook.

After generating the buddy list, host mobile terminal 100 transmits an invitation message to the client mobile terminals of the candidate participants. In the embodiment, the invitation message is transmitted to client mobile terminal 500 as an example. That is, host mobile terminal 100 registers client mobile terminal 500 to the buddy list at step S110, transmits an invitation message to the SMS server in step S125. Upon receiving the invitation message, SMS server 200 forwards the invitation message to client mobile terminal 500 in step S130. The invitation message is transmitted with the IP address assigned to host mobile terminal 100 at step S115. The invitation message also contains information of identification number of host mobile terminal 100 and port number for a current session in addition to the IP address.

Upon receiving the invitation message, client mobile terminal 500 checks that the invitation message is a mobile messenger service message, and activates the messenger application in step S135. Next, client mobile terminal 500 extracts the information on the host mobile terminal, i.e. the identification number and current session port number of host mobile terminal 100 in step S140.

Next, client mobile terminal 500 is coupled with PDSN 400 through a PPP connection in step S145 and assigned an IP address from PSDN 400 in step S150. If an IP address is assigned, client mobile terminal 500 transmits an acceptance message to PDSN 400 in accordance with a user command in step S155. Upon receiving the acceptance message, PDSN 400 forwards the acceptance message to host mobile terminal 100 in step S160.

Since client mobile terminal 500 knows the IP address of host mobile terminal 100 through the invitation message, client mobile terminal 500 transmits the acceptance message with the IP address of the host mobile terminal as a destination address and the IP address assigned from PSDN 400 as a source address. Preferably, the acceptance message also contains information on a protocol, port number, and authentication in addition to the IP address information.

Upon receiving the acceptance message, host mobile terminal 100 updates its buddy list so as to maintain the client mobile terminal transmitting the acceptance message in the buddy list and removes other candidate mobile terminals that do not transmit an acceptance message in step S165. Next, host mobile terminal 100 transmits the updated buddy list to client mobile terminal 500 via the PDSN in steps S170 and S175. That is, host mobile terminal 100 transmits the updated buddy list to PSDN (S170), and the PDSN forwards the updated buddy list to client mobile terminal 500.

If host and client mobile terminals 100 and 500 share the buddy list, the mobile messenger service starts based on the IP network in step S180. That is, the host and client mobile terminals are connected to PDSN 400 such that IP-based mobile messenger service is provided between the host and client mobile terminals.

It is assumed that the mobile messenger service is initialized through the procedure of FIG. 2 such that the host and client mobile terminals 100 and 500 are in a mobile messenger service session. In this embodiment, the voice messaging method is described with an exemplary situation in which host mobile terminal 100 transmits a voice message to client mobile terminal 500.

Figure 3:
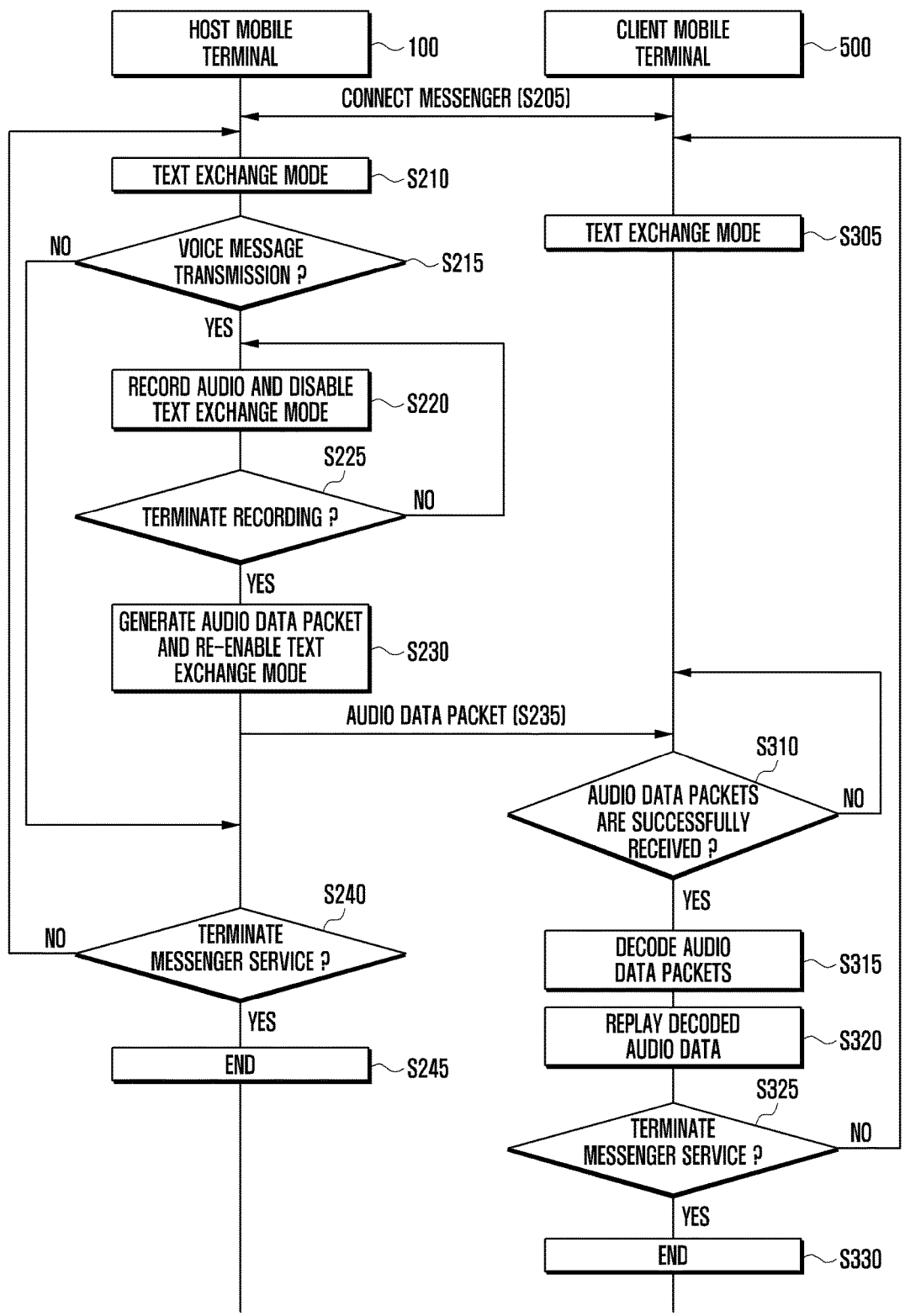
FIG. 3 is a flowchart of a voice messaging method in a mobile messenger service according to the present invention.

Referring to FIG. 3, after a messenger service session is established between the host and client mobile terminals 100 and 500 in step S205, and the host and client mobile terminals operate in a text exchange mode in steps S210 and S305.

Host mobile terminal 100 detects if a command input for transmitting a voice message has been issued in step S215. If a voice message command input is detected, host mobile terminal 100 starts recording an audio (for example, voice) and disables text messaging in step S220. For example, if a user inputs a voice messaging request command, host mobile terminal 100 records a voice input right after the voice messaging request command is received. For receiving and processing the voice, host mobile terminal 100 includes a microphone and audio storage unit such that the audio signal input through the microphone is stored in the audio storage unit.

Host mobile terminal 100 detects whether a command for stopping the voice recording is issued in step S225 while the voice recording is progressing.

If a voice record stop command is detected in step S225, the host mobile terminal stops recording the voice, re-enables the text-messaging, and generates an audio file with the audio recorded before the detected voice record stop command in step S230. At this time, host mobile terminal 100 encodes the recorded voice within an audio file and then segments the audio file in available transmission size. In this embodiment, an Enhanced Variable Rate Codec (EVRC) is used for compressing the recorded voice. The compressed and segmented audio data are contained in data fields of audio data packets each having an IP header of which source and destination fields are set to the IP addresses of the host and client mobile terminals.

Next, host mobile terminal 100 transmits the audio data packets to client mobile terminal 500 in step S235.

If a reception of the audio data packet is detected, client mobile terminal 500 determines if all the audio data packets are successfully received in step S310. If all the audio data packets are successfully received, client mobile terminal 500 decodes the audio packets to restore the audio file in step S315. That is, client mobile terminal 500 designates a time duration for receiving the audio data packets and then decodes the audio data packets received in the time duration to restored the audio file. The decoding process is performed with reference to the audio data segmentation information implied within the headers of the audio data packets.

After the audio data packets are successfully decoded and restored into the transmitted audio file, client mobile terminal 500 replays the audio file in step S320. It is preferred that the client mobile terminal determines if it is in an audio input state and start replays of the audio file when it is not in an audio input state.

Next, client mobile terminal 500 determines if a command for terminating the messenger service session is issued in step S325. If a session termination command input is detected, the client mobile terminal ends the messenger service session in step S330. If no session termination command is detected, the client mobile terminal repeats steps 305 to 325.

Meanwhile, after transmitting the audio data packets at step S235, host mobile terminal 100 determines if a session termination command input is detected in step S240. For example, if a session termination command is input by a user's key manipulation or received from client mobile terminal 500, the host mobile terminal ends the messenger service session in step S245.

In this embodiment outlined in FIG. 3, host mobile terminal 100 starts recording a voice in response to an audio transmission request command, performs compression and segmentation on the recoded audio data, and directly transmits the audio in the form of audio data packets to client terminal 500. That is, the voice messaging is carried out between the host and client mobile terminals with engagement of any mobile communication system and server.

Accordingly, it is possible to transmit a voice message to a specific counterparty mobile terminal among the participant terminals in a mobile messenger service while maintaining the mobile messenger service session.

Figure 4:
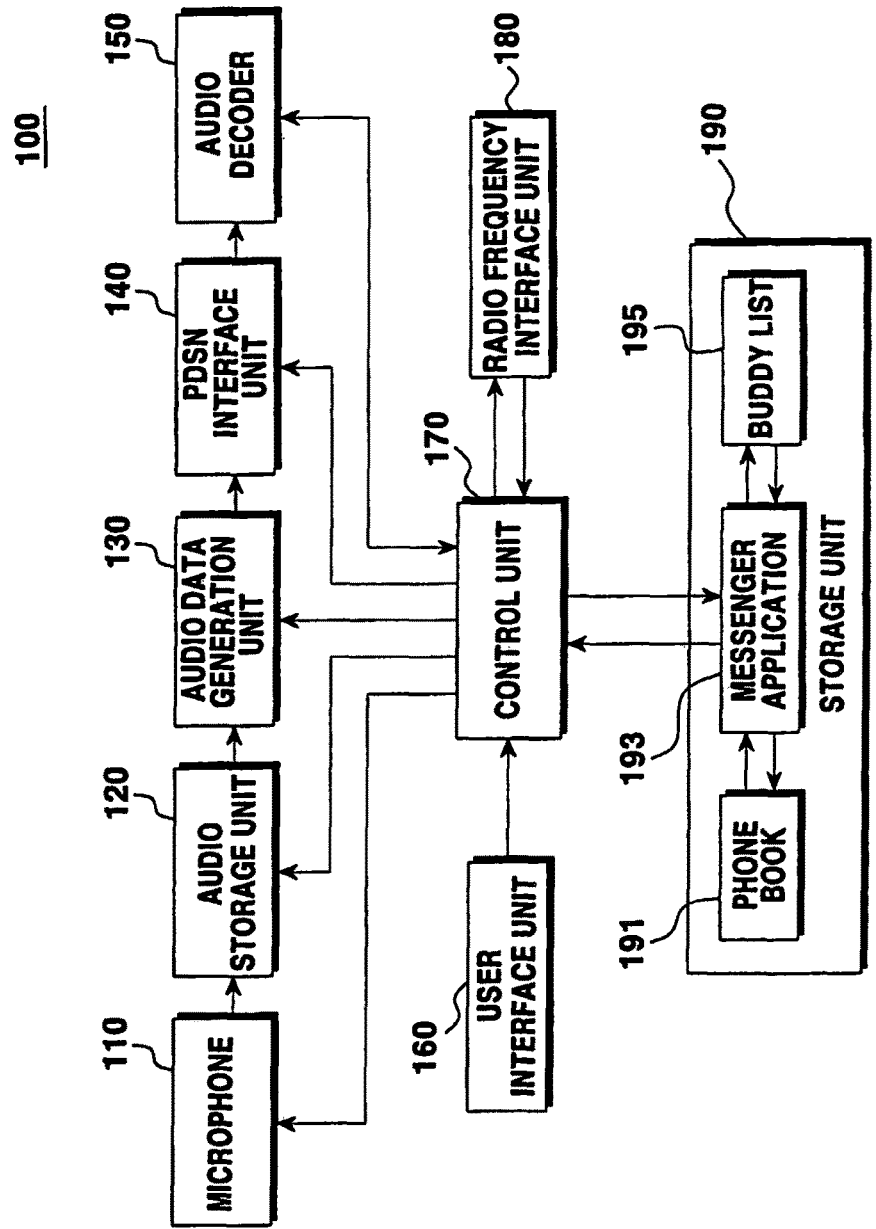
FIG. 4 is a block diagram illustrating a configuration of a mobile terminal supporting a voice messaging during a mobile messenger service according to the present invention.

FIG. 4 shows an exemplary configuration of the host mobile terminal in the FIGS. 1 to 3. However, client mobile terminals 500 and 600 can be implemented with the same configuration. The configuration of the host mobile terminal is determined by a transmission of the invitation message.

Referring to FIG. 4, host mobile terminal 100 includes a microphone 110, an audio storage unit 120, an audio data generation unit 130, a PDSN interface unit 140, an audio decoder 150, a user interface unit 160, a control unit 170, and a radio frequency interface 180, and a storage unit 190.

Microphone 110 captures a sound wave (for example, a voice) and converts the sound wave into electrical signals. That is, microphone 110 receives a user voice in the mobile messenger service session and stores the user voice into audio storage unit 120 in the form of audio data, under the control of control unit 170.

Audio storage unit 120 stores the audio signals input through microphone 110. That is, audio storage unit 120 starts and ends recording the voice in response to recording start and end commands generated by control unit 170.

Audio data generation unit 130 converts the audio signal stored in audio storage unit 120 into a data format suitable for PSDN 400. For example, audio data generation unit 130 segments the audio data into transmission data units of predetermined size and compresses the transmission data units in a predetermined coding scheme. Preferably, the transmission data units are compressed using an Enhanced Variable Rate Codec (EVRC). The transmission data units are carried by the audio data packets each having a header contained the IP address of host mobile terminal 100 as a source address and the IP address of client mobile terminal 500 as a destination address.

PDSN interface unit 140 is responsible for data communication with PDSN 400 (see FIG. 2). Particularly, PDSN interface unit 140 allows host mobile terminal 100 to communicate with other mobile terminals registered in the buddy list for the mobile messenger service. Particularly, PDSN interface unit 140 transfers the audio data packets generated by audio data generation unit 130 to the destination address, i.e. client mobile terminals 500 and 600 and receives an audio data packet transmitted by client mobile terminals 500 and 600 that are participated in a mobile messenger service session.

Audio decoding unit 150 decodes the audio data packets received through PDSN interface unit 140. That is, audio decoding unit 150 decompresses the EVRC-coded audio data packets.

User interface unit 160 provides a graphic interface in order for a user to control the operation of host mobile terminal 100. Particularly, user interface unit 160 receives input commands for transmitting the invitation message and audio data and transmits the commands to control unit 170.

Control unit 170 controls the operation of host mobile terminal 100 on the basis of the user commands and predetermined events associated with the applications.

If an audio message transmission request is entered, control unit 170 controls microphone 110, audio storage unit 120, audio data generation unit 130, and PDSN interface unit 140 for recording audio signal and transmitting the audio signal in the form of the audio data packet. The recoded audio signal is formatted into audio data packets and then transmitted to client terminal 500.

Control unit 170 also controls audio decoder 150 to process the audio data packets received through PDSN interface 140 and output the audio data though a speaker (not shown) as an audible sound wave.

Preferably, control unit 170 controls such that the text message exchange is stopped while the audio data packets are transmitted or received. That is, control unit 170 controls host mobile terminal 100 to operate in a text exchange mode and to switch the operation mode to the audio messaging mode in response to an audio data transmission request command input through PDSN interface unit 140 or when received an audio data packet from a client mobile terminal. In this case it is preferred to stop the text exchange. This is because host terminal 100 exchanges the text and audio data through a virtual port (for example, socket).

Radio frequency interface unit 180 controls the voice communication of the host mobile terminal. Radio frequency interface unit 180 is responsible for transmitting and receiving an invitation message in the form of a short message via SMS server 200 (see FIG. 2).

Storage unit 190 stores an operating system, application programs, and the information related to the operations of application programs. Particularly, storage unit 190 stores a phonebook 191, a messenger program, and a buddy list 195. Buddy list 195 provides the information of members of a group for communicating through the mobile messenger service.

The voice messaging method of the present invention enables transmitting a voice message to a specific member participated in a mobile messenger service session without engagement of a mobile communication system or a server.

As described above, the voice messaging method and mobile terminal supporting the voice messaging method according to the present invention enables a user participating in a mobile messenger service session to transmit a voice message to another participant of the session without engagement of a mobile communication system or a server. In the case where a single counterparty user is participating in the mobile messenger service session, the participants can communicate with each other using a voice messaging function in the mobile messenger service rather than through costly voice communication channel, resulting in cost effective voice communication.

Although exemplary embodiments of the present invention have been described in detail hereinabove, it should be clearly understood that many variations and/or modifications of the basic inventive concepts herein taught which may be made by those skilled in the present art will still fall within the spirit and scope of the present invention, as further defined by the appended claims.

What is claimed is:

1. A portable communication device comprising:
    a display;
    a memory;
    communication circuitry capable of supporting a circuit-switched communication connection; and
    a processor adapted to:
        execute a specified application to communicate with an external electronic device via a packet data communication connection, wherein the memory stores contact information including a phone number corresponding to the external electronic device;
        control, while executing the specified application, the display to display at least one portion of the contact information via a user interface corresponding to the specified application;
        receive a user input with respect to the at least one portion of the contact information presented via the user interface; and
        based at least in part on receiving the user input, transmit an invitation message to the external electronic device using the phone number via a message service server corresponding to a circuit-switched communication connection supported by the communication circuitry,
    wherein the invitation message includes a destination address to be used to invite a user of the external electronic device to a messaging group corresponding to the specified application.

2. The portable communication device of claim 1, wherein the processor is further adapted to:
    execute, as at least part of the specified application, a messenger application to exchange a message with the external electronic device.

3. The portable communication device of claim 1, wherein the contact information is generated using at least part of a phonebook corresponding to a contact application prior to presenting the at least one portion of the contact information.

4. The portable communication device of claim 1, wherein the processor is further adapted to:
    control the display to display, via the user interface, an indication whether the user of the external electronic device is available to communicate via the specified application.

5. The portable communication device of claim 1, wherein the message service server uses a short message service to transmit the invitation message.

6. The portable communication device of claim 1, wherein the invitation message includes identification information corresponding to another user of the portable communication device.

7. The portable communication device of claim 1, wherein the processor is further adapted to, based at least in part on a response message received from the external electronic device in response to the invitation message:
generate the messaging group;
control the display to display another user interface corresponding to the messaging group; and
transmit at least part of a text received in the other user interface to the external electronic device via the packet data communication connection.

8. The portable communication device of claim 7, wherein the response message is received via the packet data communication connection.

9. The portable communication device of claim 7, further comprising:
other communication circuitry to establish the packet data communication connection using a short range communication protocol,
wherein the processor transmits the at least part of the text using the other communication circuitry.

10. The portable communication device of claim 1, wherein the processor is further adapted to:
receive another user input with respect to the at least one portion of the contact information; and
based at least in part on receiving the other input, transmit another invitation message to the other external electronic device using a phone number corresponding to the other external electronic device.

11. A portable communication device comprising:
a display;
a memory;
communication circuitry; and
a processor adapted to:
execute a specified application to communicate with an external electronic device, wherein the memory stores contact information corresponding to the external electronic device;
control, while executing the specified application, the display to display, via a user interface corresponding to the specified application, at least one portion of the contact information;
receive a user input with respect to the at least one portion of the contact information presented via the user interface; and
based at least in part on receiving the user input, transmit, using the communication circuitry, an invitation message to the external electronic device via a message service server based at least in part on the contact information,
wherein the invitation message includes a destination address to be used to invite a user of the external electronic device to a messaging group corresponding to the specified application.

12. The portable communication device of claim 11, wherein the processor is further adapted to:
execute, as at least part of the specified application, a messenger application to exchange a message with the external electronic device.

13. The portable communication device of claim 11, wherein the contact information is generated using at least part of a phonebook corresponding to a contact application prior to presenting the at least one portion of the contact information.

14. The portable communication device of claim 11, wherein the contact information includes a phone number corresponding to the external electronic device, and
wherein the processor transmits the invitation message based at least in part on the phone number.

15. The portable communication device of claim 11, wherein the processor is further adapted to:
control the display to display, as at least part of the executing of a specified application, via the user interface, an indication whether the user of the external electronic device is available to communicate via the specified application.

16. The portable communication device of claim 11, wherein the invitation message includes identification information corresponding to another user of the portable communication device.

17. The portable communication device of claim 11, wherein the processor is further adapted to, based at least in part on a response message received from the external electronic device in response to the invitation message:
generate the messaging group;
control the display to display another user interface corresponding to the messaging group; and
transmit, using the communication circuitry, at least part of a text received in the other user interface to the external electronic device via a packet data communication connection.

18. A non-transitory machine-readable storage device storing instructions that, when executed by one or more processors, cause the one or more processors to perform operations comprising:
executing a specified application to communicate with an external electronic device via a packet data communication connection, wherein a memory stores contact information including a phone number corresponding to the external electronic device;
displaying, via a display operatively coupled with the one or more processors, at least one portion of the contact information via a user interface corresponding to the specified application;
receiving a user input with respect to the at least one portion of the contact information presented via the user interface; and
based at least in part on receiving the user input, transmitting an invitation message to the external electronic device using the phone number corresponding to the external electronic device via a message service server corresponding to a circuit-switched communication connection,
wherein the invitation message includes a destination address to be used to invite a user of the external electronic device to a messaging group corresponding to the specified application.

19. The non-transitory machine-readable storage device of claim 18, wherein the executing of the specified application comprises:
presenting, via the user interface, an indication indicating whether the user of the external electronic device is available to communicate via the specified application.

20. The non-transitory machine-readable storage device of claim 18, wherein the instructions, when executed by one or more processors, cause the one or more processors to perform further operations based at least in part on receiving a response message from the external electronic device in response to the invitation message, comprising:
generating the messaging group;

displaying another user interface corresponding to the messaging group via the display; and transmitting at least part of a text received in the other user interface to the external electronic device via the packet data communication connection.

\* \* \* \* \*